(12) United States Patent
Graham et al.

(10) Patent No.: US 7,914,836 B2
(45) Date of Patent: Mar. 29, 2011

(54) PIZZA WITH SEGMENTED CRUST

(75) Inventors: Peter G. Graham, Lucas, TX (US);
Todd W. Craig, Frisco, TX (US); Carrie L. Goff, Louisville, KY (US)

(73) Assignee: Pizza Hut, Inc., Plano, TX (US)

( * ) Notice: Subject to any disclaimer, the term of this patent is extended or adjusted under 35 U.S.C. 154(b) by 900 days.

(21) Appl. No.: 11/405,143

(22) Filed: Apr. 17, 2006

(65) Prior Publication Data

US 2007/0243291 A1    Oct. 18, 2007

(51) Int. Cl.
*A21D 10/00* (2006.01)
(52) U.S. Cl. ........................................ 426/549
(58) Field of Classification Search ........... 426/549, 426/622, 653, 389, 391, 478, 496, 499, 500, 426/503, 518
See application file for complete search history.

(56) References Cited

U.S. PATENT DOCUMENTS

| | | | |
|---|---|---|---|
| 3,379,139 A | 4/1968 | Lipinsky | |
| 4,020,184 A | 4/1977 | Chesner | |
| 4,313,961 A | 2/1982 | Tobia | |
| 4,400,404 A | 8/1983 | Persi | |
| 4,661,361 A * | 4/1987 | Mongiello et al. | 426/283 |
| D307,371 S | 4/1990 | D'Orlando | |
| D311,304 S | 10/1990 | Virk | |
| 5,185,167 A | 2/1993 | Schwartz | |
| 5,312,633 A | 5/1994 | Schwartz | |
| D358,074 S | 5/1995 | McClean | |
| 6,194,017 B1 | 2/2001 | Woodward et al. | |
| D455,617 S | 4/2002 | Craig et al. | |
| 2004/0011219 A1 | 1/2004 | Sioutis et al. | |
| 2004/0018291 A1 | 1/2004 | Nelson et al. | |
| 2004/0175477 A1 | 9/2004 | Walter et al. | |

OTHER PUBLICATIONS

Business Wire, Pizza Hut Introduces Revolutionary Twisted Crust Pizza Featuring Rip and Dip Breadstick Crust, Mar. 19, 2001. pp. 1-4. http://findarticles.com/p/articles/mi_m0EIN/is_2001_March_19/ai_71808866.*
Cooks. Stuffed-Crust Pizza. pp. 1-2. http://www.cooksrecipes.com/gmeat/stuffed-crust-pizza-recipe.html. Apr. 11, 2004. Date obtained from http://web.archive.org p. 1.*
Mcbutter. Molly Mcbutter Maker Claims Product Can Help You With Your Diet. pp. 1-2. Mar. 28, 2001.*

* cited by examiner

*Primary Examiner* — Kelly Bekker
(74) *Attorney, Agent, or Firm* — Stites & Harbison, PLLC; David W. Nagle, Jr.; Terry L. Wright (57) ABSTRACT

A pizza includes a dough member and at least one topping disposed on the dough member. The dough member defines a substantially flattened shape and includes a central portion and a border portion. The central portion defines a perimeter. The border portion extends about the perimeter of the central portion. The border portion of the dough member is divided into a plurality of dough segments, each dough segment being turned relative to the perimeter of the central portion.

10 Claims, 15 Drawing Sheets

PIZZA WITH SEGMENTED CRUST

CROSS-REFERENCE TO RELATED APPLICATIONS

The present application is related to U.S. patent application Ser. No. 11/405,153, entitled "SEGMENTED PIZZA CRUST SYSTEM," referenced as P350.133.101, filed on even date herewith, and the contents of which are incorporated herein by reference. The present application is also related to U.S. Des. patent application Ser. No. 29/258,129, now U.S. Pat. No. D548,426, entitled "PIZZA CRUST," referenced as P350.132.101, filed on even date herewith, and the contents of which are incorporated herein by reference.

BACKGROUND OF THE INVENTION

Pizza is an extremely popular type of food. It is often formed as an open-faced pie made up of a flattened dough member with sauce, cheese, and other toppings disposed on the dough member. Pizzas with special crusts can be particularly enjoyable to eat. For example, one type of pizza includes an outer crust formed of breadstick dough and seasoning. Another type of pizza includes an outer crust having a filling, such as cheese. Other tasty and visually appealing outer crust variations remain to be realized.

SUMMARY OF THE INVENTION

One aspect of the invention relates to a pizza. The pizza includes a dough member and at least one topping disposed on the dough member. The dough member defines a substantially flattened shape and includes a central portion and a border portion. The central portion defines a perimeter, and the border portion extends about the perimeter of the central portion. The border portion of the dough member is divided into a plurality of dough segments, each dough segment being turned relative to the perimeter of the central portion.

While aspects of a pizza according to one embodiment of the present invention have been described above, other related products, systems, and methods are also disclosed and provide additional advantages.

BRIEF DESCRIPTION OF THE DRAWINGS

Embodiments of the invention are described with respect to the figures, in which like reference numbers denote like elements, and in which.

DETAILED DESCRIPTION

Figure 1:
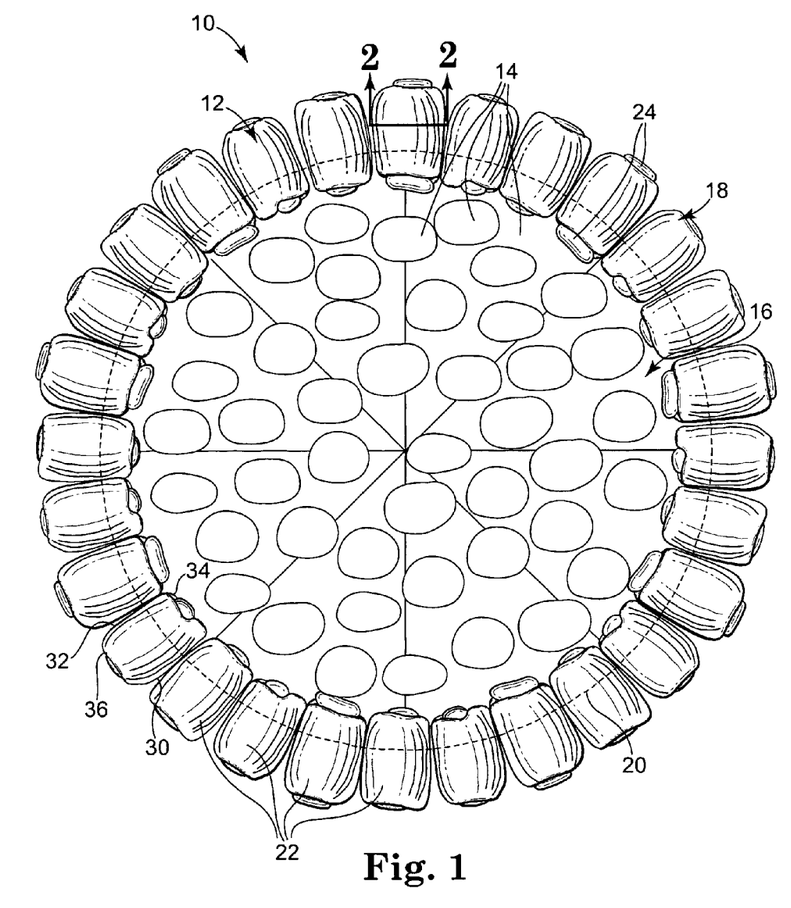
FIG. 1 is a top view of a pizza, according to an embodiment of the present invention.

FIG. 1 shows a pizza 10 in an assembled and baked state. The pizza 10 is also optionally provided in an unbaked state, such as raw or frozen, and/or in a partially assembled state. The pizza 10 includes a crust 12 and optionally includes at least one topping 14. The topping 14 is optionally pepperoni, sausage, onion, bacon, mushroom, and others. The crust 12 is also optionally described as a substantially flat dough member or a flattened mass of dough. The crust 12 includes an inner portion 16 (shown covered in FIG. 1), also described as a central portion, a central dough portion, or an inner crust, and an outer portion 18, also described as a border portion or an outer crust.

The inner portion 16 is bordered by a perimeter 20 extending about the inner portion 16. The outer portion 18 extends about the inner portion 16 proximate the perimeter 20 and is optionally connected to the inner portion 16 proximate the perimeter 20. The outer portion 18 is divided into pieces to define a plurality of dough segments 22, also described as dough members or divided pieces. As will be described in greater detail, each of the plurality of dough segments 22 optionally extends onto the inner portion 16 of the crust 12. It should be noted that the term "crust" is used in association with dough that is any one or combination of dough in a baked state, an unbaked state, or a frozen state.

Each of the plurality of dough segments 22 defines a top side 26, a bottom side 28 (FIG. 2), a first side 30, a second side 32, a first end 34, and a second end 36. The first side 30 is located opposite the second side 32. Similarly, the first end 34 is located opposite the second end 36. Each of the plurality of dough segments 22 is turned relative to the perimeter 20 of the inner portion 16, such that the first end 34 of each of the plurality of dough segments 22 extends substantially inwardly toward the perimeter 20 of the inner portion 16. In turn, the second end 36 of each of the plurality of dough segments 22 extends substantially outwardly away from the perimeter 20. For example, each of the plurality of dough segments 22 optionally projects substantially radially from the perimeter 20. Additionally, the first and second sides 30, 32 of each of the plurality of dough segments 22 are distinct, or otherwise free or disconnected from, an adjacent dough segment 22, according to specific embodiments of the invention.

Figure 2:
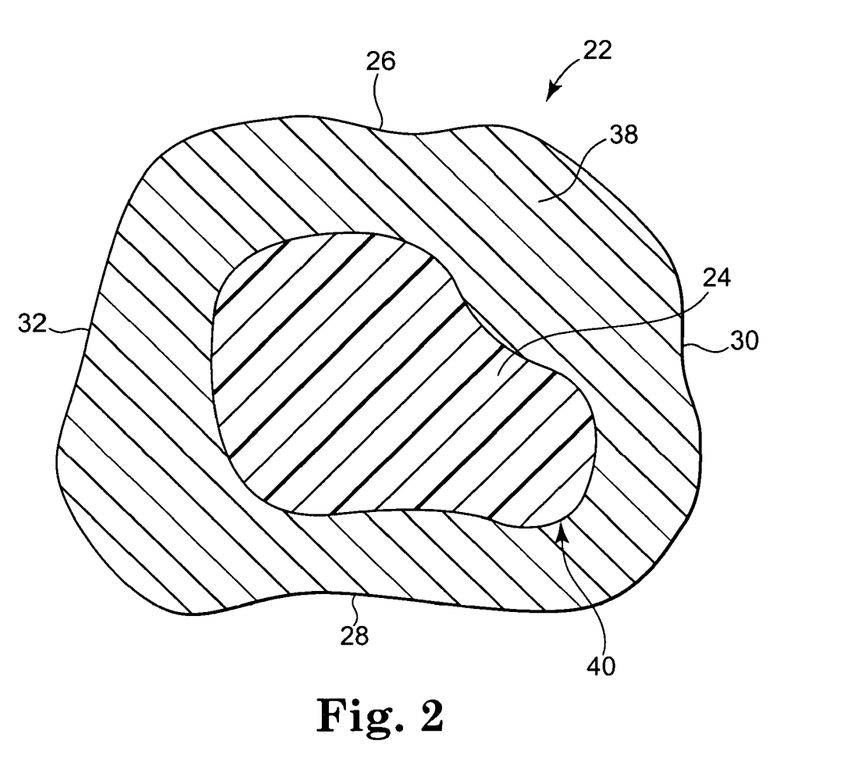
FIG. 2 is a cross-sectional view of an outer crust segment along line 2-2 of FIG. 1, according to an embodiment of the present invention.

FIG. 2 illustrates one of the plurality of dough segments 22 from a cross-sectional view along line 2-2 of FIG. 1. With reference to FIG. 2, each of the plurality of dough segments 22 optionally includes a filling 24, such as cheese. The filling 24 is optionally substantially enclosed within a corresponding dough segment 22. However, as shown in FIG. 1, the filling 24 optionally protrudes, emerges, or is otherwise exposed from the corresponding segment 22. Generally, each one of the plurality of dough segments 22 includes a body 38 defining a cavity 40. As referenced above, the filling 24 is optionally disposed in the cavity 40 of the body 38 and partially exposed from the body 38. Alternatively, the filling 24 is optionally entirely enclosed within the body 38. As shown, the body 38 is substantially tubular in shape, but a variety of shapes are also acceptable.

Figure 9:
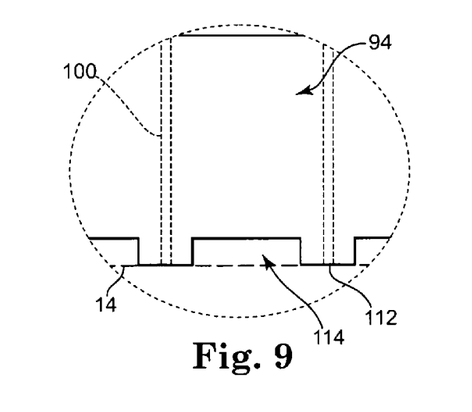
FIG. 9 is an enlarged, front view of another inner wall of the cutter of FIG. 5, according to an embodiment of the present invention.
Figure 10:
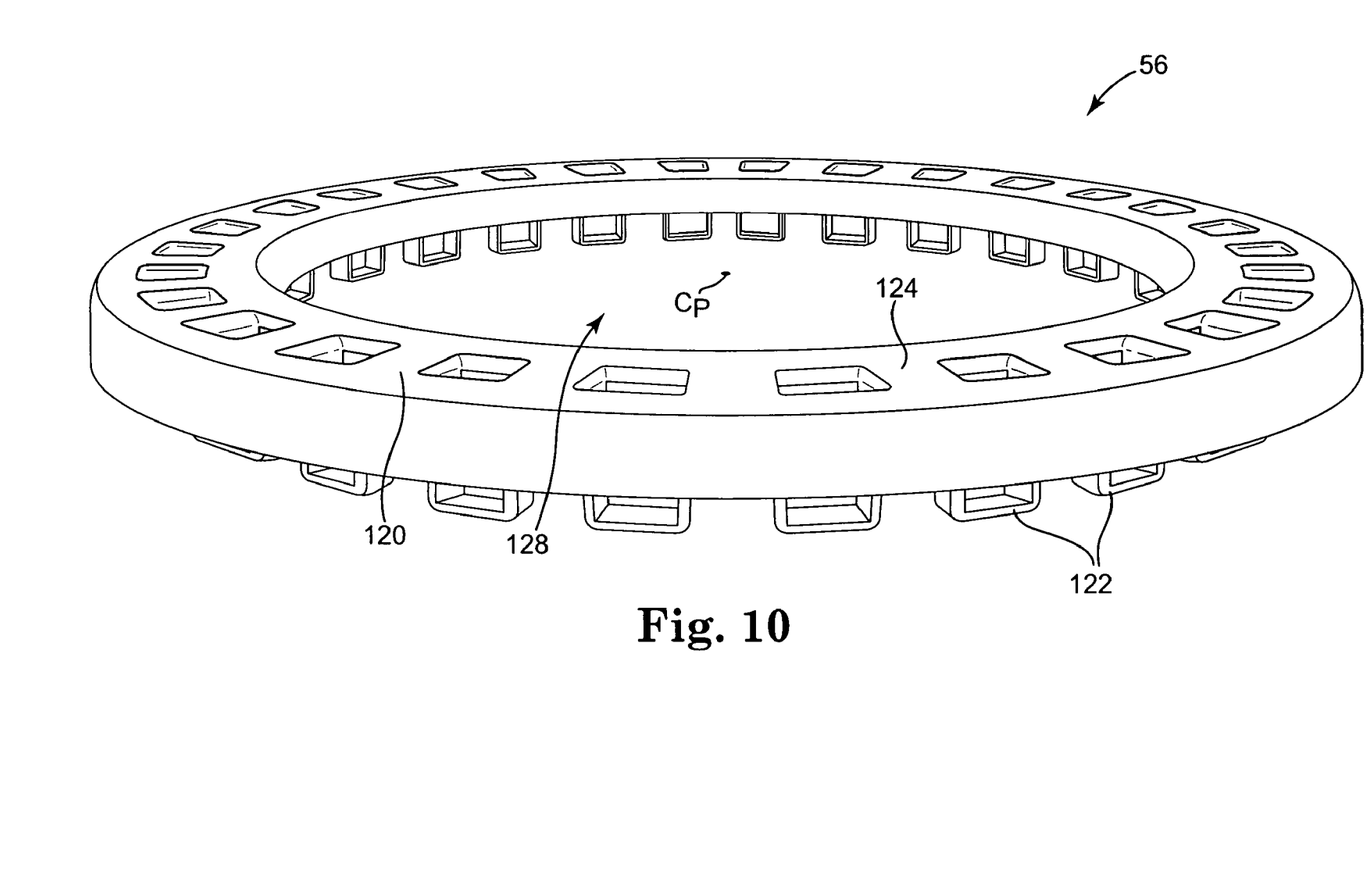
FIG. 10 is top, perspective view of a press, according to an embodiment of the present invention.
Figure 11:
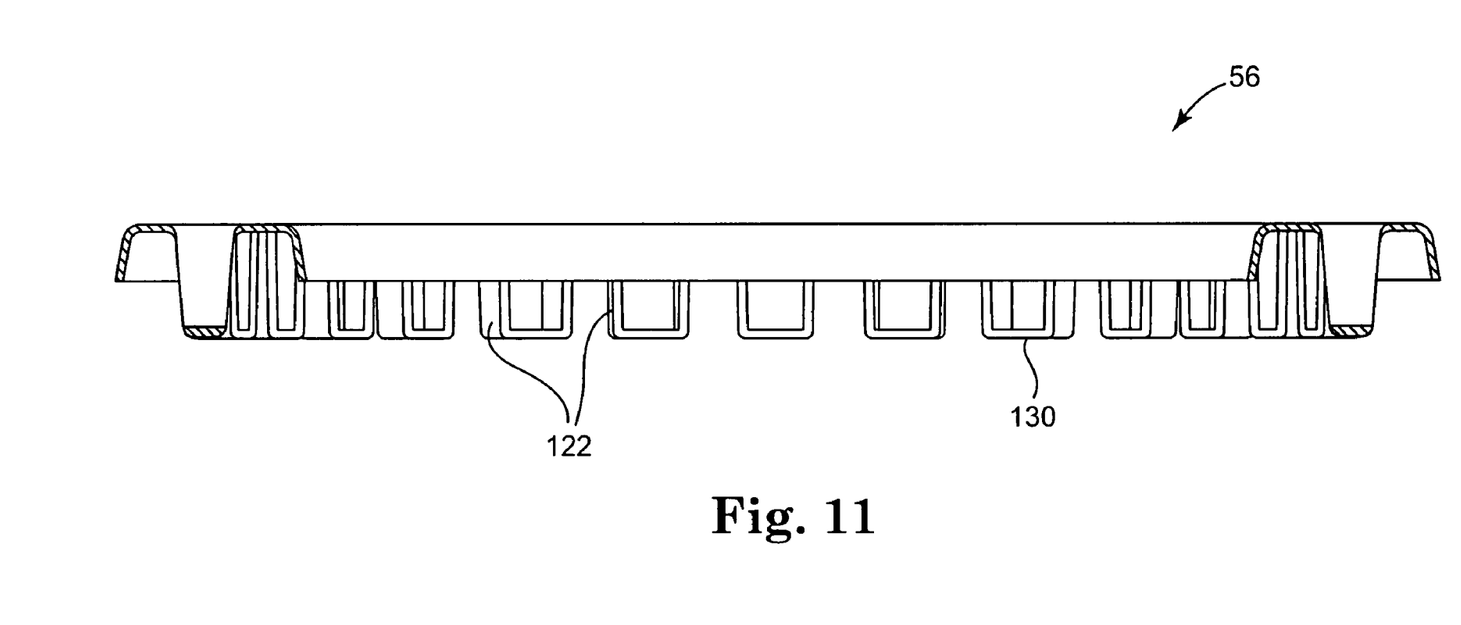
FIG. 11 is a cross-sectional view of the press of FIG. 10, according to an embodiment of the present invention.

A pizza making system for making the pizza 10 optionally includes a cutting wall 52 (FIGS. 3 and 4), a cutter 54 (FIGS. 5-9), and a press 56 (FIGS. 10 and 11). A pan 58 (FIG. 12) and/or a topping guide 60 (FIG. 19) are also optionally used in addition to the system or as a part of the system. The components, their operation, and methods of use thereof should be understood with reference to the text that follows.

Figure 3:
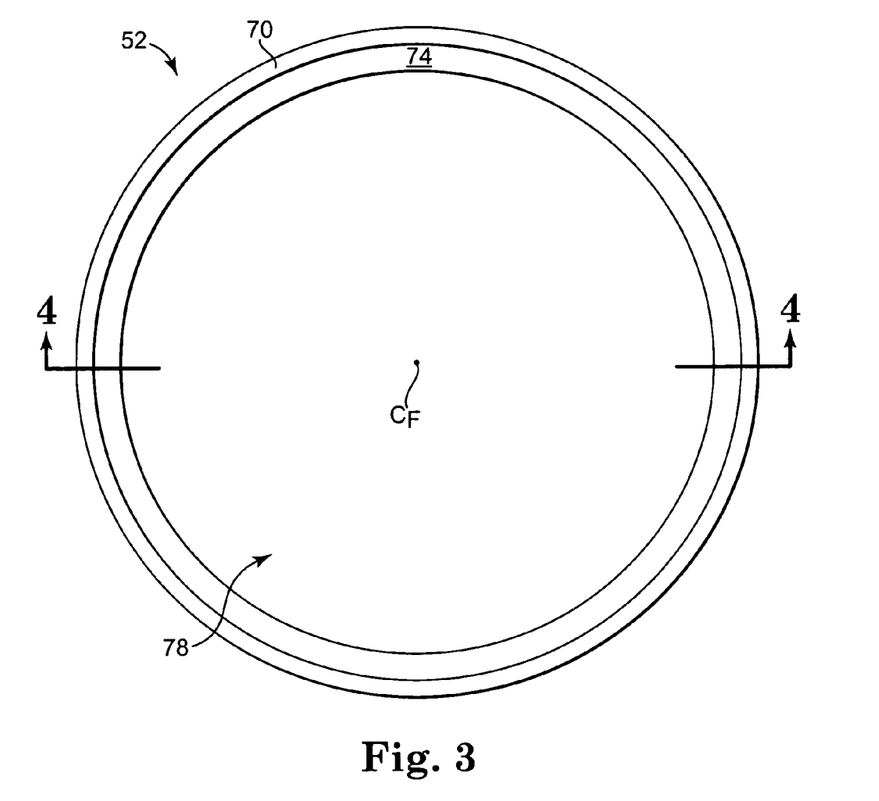
FIG. 3 is a top view of a cutting wall, according to an embodiment of the present invention.
Figure 4:
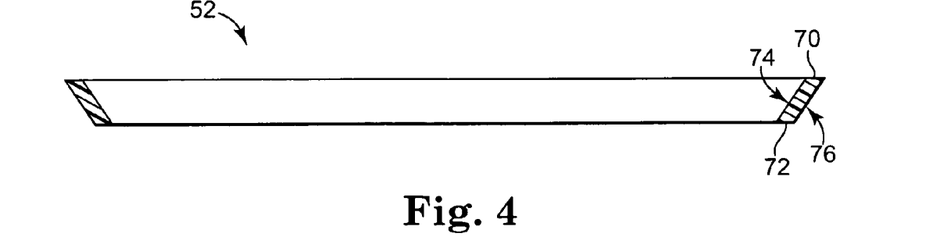
FIG. 4 is a front cross-sectional view of the cutting wall of FIG. 3 along line 4-4 of FIG. 3, according to an embodiment of the present invention.

FIGS. 3-4 are top and cross-sectional views, respectively of the cutting wall 52. The cutting wall 52 is also optionally described as a false wall, an anvil, or anvil ring. The cutting wall 52 extends about a center $C_F$ and defines a top 70, a bottom 72, an inner face 74, an outer face 76, and an open interior 78. The inner face 74 is optionally substantially angled, or otherwise non-orthogonal, to the top 70 of the cutting wall 52. For example, the inner face 74 is optionally angled inwardly toward the center $C_F$. In turn, the outer face 76 of the cutting wall 52 is also optionally angled, for example at a substantially similar angle as that of the inner face 74.

In general terms, the cutting wall 52 is adapted to be received in the pan 58 to "take up" or otherwise compensate for any non-uniformities, or irregularities, in the pan 58, such as warping, dents, or protrusions. As will be described in greater detail, the inner face 74 of the cutting wall 52 is adapted to form a substantially complementary fit with a portion of the cutter 54, while the outer face 76 is adapted to allow the cutting wall 52 to be received within the pan 58. In particular, the inner face 74 of the cutting wall 52 is adapted to provide a uniform surface for performing a cutting operation on the outer portion 18 of the crust 12 with the cutter 54.

Figure 5:
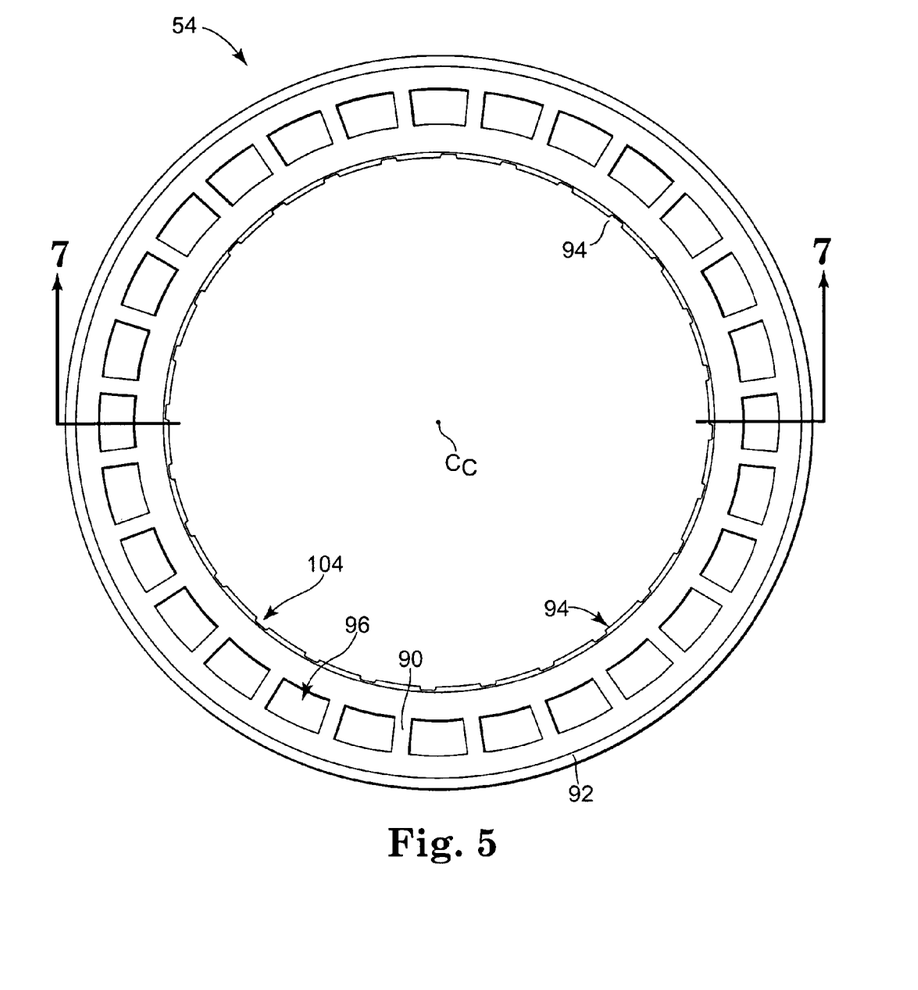
FIG. 5 is a top view of a cutter, according to an embodiment of the present invention.
Figure 6:
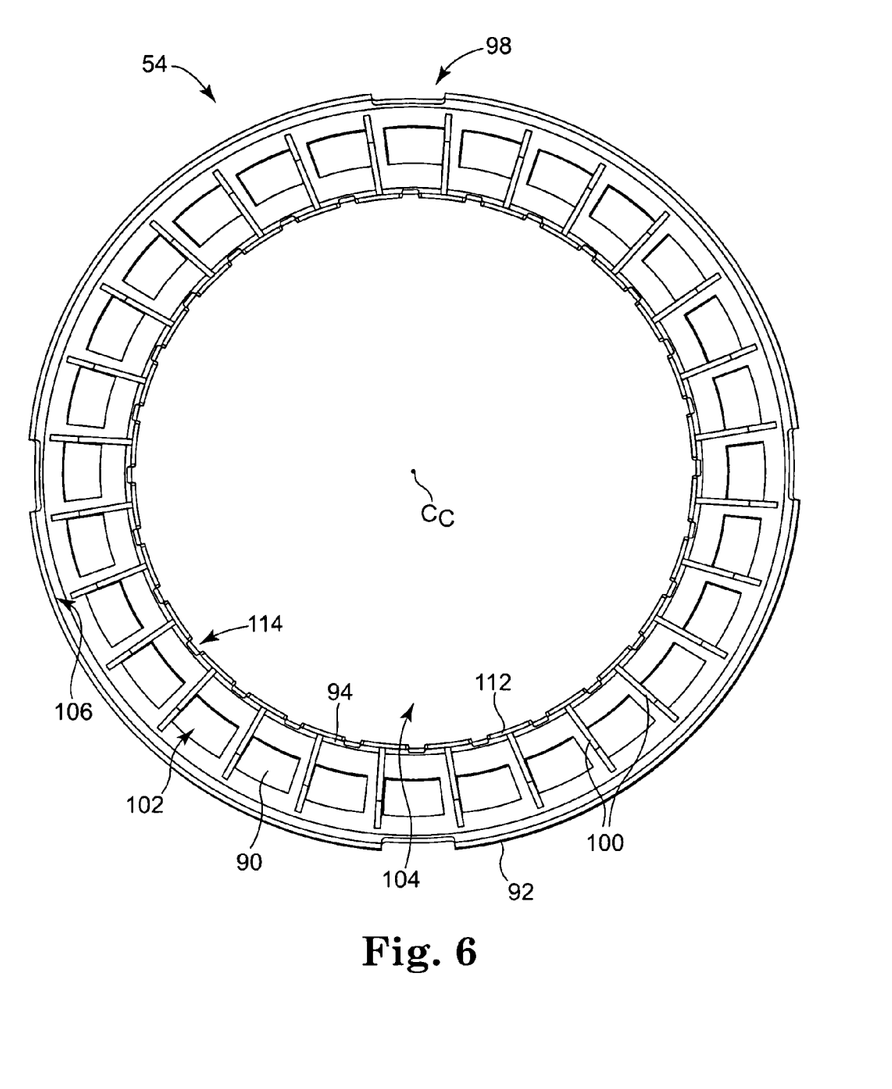
FIG. 6 is a bottom view of the cutter of FIG. 5, according to an embodiment of the present invention.

FIGS. 5-6 are top and bottom views, respectively, of the cutter 54. The cutter 54 includes a top wall 90, an outer wall 92, and an inner wall 94. The cutter 54 defines a plurality of openings 96 through the top wall 90 and a plurality of grip openings 98 through the outer wall 92. The cutter 54 also includes a plurality of cutting fins 100, also described as cutting blades, extending downwardly from the top wall 90. Each of the plurality of cutting fins 100 is spaced from an adjacent cutting fin 100 to define a plurality of spaces 102 between the cutting fins 100. The cutter 54 optionally extends about a center $C_C$ to define an open interior 104.

The top wall 90 is optionally substantially planar, with each of the plurality of openings 96 through the top wall 90 being substantially rectangular. Each of the plurality of openings 96 is open to one of the plurality of spaces 102 between adjacent cutting fins 100. The inner wall 94 is optionally substantially angled inwardly toward the center $C_C$, while the outer wall 92 is optionally substantially angled outwardly away from the center $C_C$.

The inner and outer walls 92, 94 extend downwardly from the top wall 90. Additionally, each of the plurality of cutting fins 100 extends downwardly from the top wall 90. Each of the plurality of cutting fins 100 is shown spaced from an adjacent cutting fin 100 to define the plurality of spaces 102. For example, each the plurality of cutting fins 100 optionally extends substantially radially from the inner wall 94 relative to the center $C_C$ of the cutter 54. Additionally, each of the plurality of cutting fins 100 is optionally substantially vertical, extending substantially orthogonally from the top wall 90 of the cutter 54. Each of the plurality of cutting fins 100 optionally terminates prior to the outer wall 92, with the top wall 90 defining a plurality of shoulders 106 between each of the plurality of cutting fins 100 and the outer wall 92.

Figure 7:
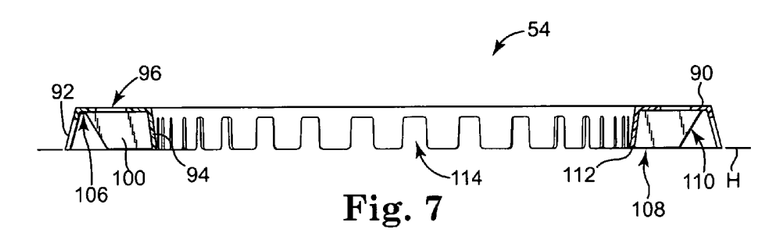
FIG. 7 is a front, cross-sectional view of the cutter of FIG. 5 along line 7-7 of FIG. 5, according to an embodiment of the present invention.

FIG. 7 is a front, cross-sectional view of the cutter 54 along line 7-7 of FIG. 5. With reference to FIG. 7, each of the plurality of cutting fins 100 defines a leading cutting edge 108 and an outer cutting edge 110. In general terms, the leading cutting edge 108 is substantially horizontal and substantially parallel to the top wall 90, for example. The leading cutting edge 108 is optionally substantially coterminous with a terminal end 112 of the inner wall 94, but optionally extends downwardly beyond the terminal end 112 of the inner wall 94 as well.

The outer cutting edge 110 is optionally substantially non-orthogonal to the leading cutting edge 108, and angled inwardly toward the leading cutting edge 108 from the top wall 90 and toward the center $C_C$. As referenced above, the outer cutting edge 110 is optionally substantially spaced from the outer wall 92 with a portion of the top wall 90 extending between each of the plurality of cutting fins 100 and the outer wall 92 defining the plurality of shoulders 106.

Figure 8:
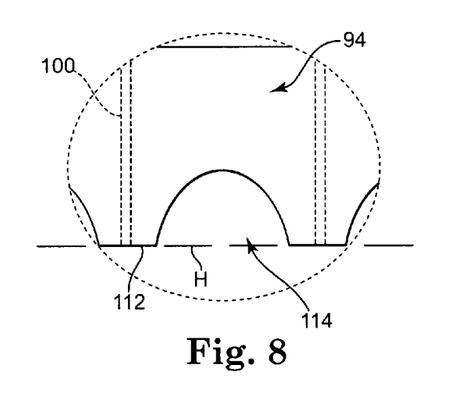
FIG. 8 is an enlarged view of an inner wall of the cutter of FIG. 5, according to an embodiment of the present invention.

As shown in FIG. 7, the inner wall 94 optionally defines a plurality of windows 114 through the inner wall 94. As shown in FIG. 7, each of the plurality of windows 114 extends upwardly from the common plane H and is substantially rectangular in shape with rounded corners. In particular, each of the plurality of windows 114 is open to one of the plurality of spaces 102 between adjacent cutting fins 100. The plurality of windows 114 are each substantially identical, or varied as desired. FIGS. 8 and 9 illustrate other embodiments of windows 114. For example, each of the plurality of windows 114 is optionally substantially hemispherical in shape (FIG. 8) and extends upwardly away from the common plane H. As another example, each of the plurality of windows 114 is optionally substantially rectangular in shape (FIG. 9) and extends upwardly away from the common plane H. As will be described in greater detail, the plurality of windows 114 are optionally used to form perforations into the crust 12 at the perimeter 20 of the inner portion 16. The inner wall 94 is also optionally characterized by an absence of any of the plurality of windows 114 with the terminal end 112 of the inner wall 94 extending downwardly and uniformly such that an entirety of the terminal end 112 resides in a common plane H.

FIG. 10 is a top perspective view of the press 56. The press 56 is also optionally described as a press ring, a punch, or a punch ring. The press 56 includes a mounting ring 120 and a plurality of press heads 122. The mounting ring 120 defines a top 124 and a bottom 126 (FIG. 11) and extends about a center $C_P$ to define an open interior 128. The plurality of press heads 122 are also optionally described as press pins or punches.

FIG. 11 is a cross-sectional view of the press 56. Each of the plurality of press heads 122 optionally defines a bottom 130 and is adapted to be received through one of the plurality of openings 96 in the top wall 90 of the cutter 54. As will be described in greater detail, each of the plurality of press heads 122 is adapted to be inserted through one of the plurality of openings 96 and into one of the plurality of spaces 102 between adjacent ones of the plurality of cutting fins 100 of the cutter 54. The plurality of press heads 122 are optionally circumferentially spaced around the mounting ring 120. For example, the plurality of press heads 122 each project downwardly from the bottom 126 of the mounting ring 120 with each of the plurality of press heads 122 substantially equally spaced from an adjacent press head 122. Additionally, although each of the plurality of press heads 122 is shown as substantially rectangular in shape, the press heads 122 optionally take a variety of shapes, including round, cylindrical shapes, for example.

Figure 12:
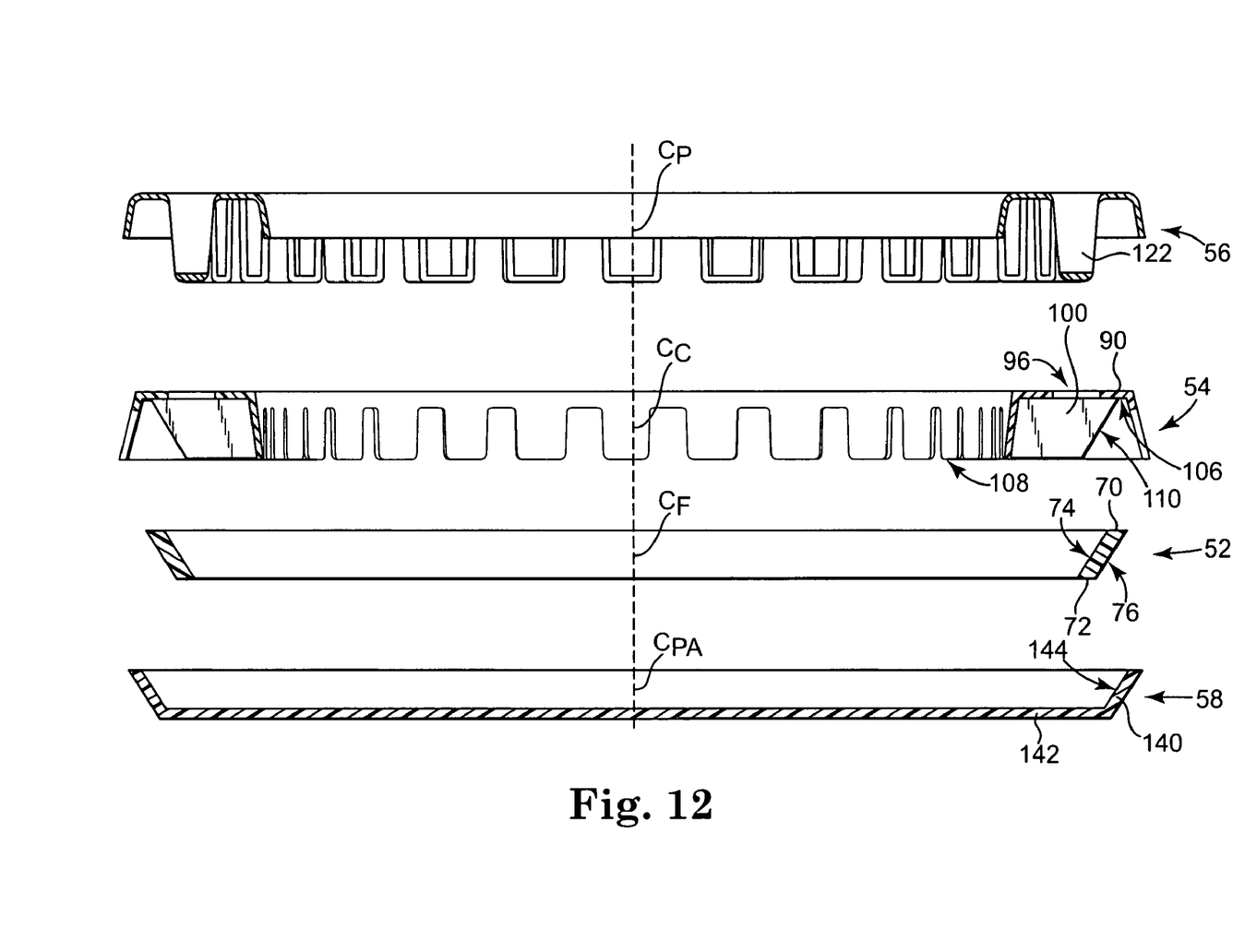
FIG. 12 is an exploded, cross-sectional view of a pizza making system, according to an embodiment of the present invention.

FIG. 12 illustrates an exploded, front, cross-sectional view of the press 56, the cutter 54, the cutting wall 52, and the pan 58, also described as a pizza pan. With reference to FIG. 12, the pan 58 includes a side wall 140 and a bottom 142 and defines a center $C_{PA}$. The side wall 140 defines an inner face 144 toward the center $C_{PA}$ of the pan 58. The pan 58 is optionally characterized by the side wall 140 including irregularities or deformations from a substantially regular or uniform shape. For example, the pan 58 is optionally substantially circular in shape, but includes deformations or irregularities, such as warping, bends, or the like.

The cutting wall 52 optionally defines a substantially uniform or regular shape such as substantially circular, for example. In an assembled form, the cutting wall 52 is disposed in the pan 58 with the outer face 76 of the cutting wall 52 toward the inner face 144 of the pan 58. The cutting wall 52 is optionally substantially taller than the side wall 140 of the pan 58 such that a portion of the cutting wall 52 projects above the side wall 140 when the cutting wall 52 is disposed in the pan 58. As will be understood in greater detail, the cutting wall 52 assists in facilitating clean cutting of the crust 12 using the cutter 54 where deformations or other non-uniformities in the pan 58 might otherwise interfere with clean cuts.

Regardless, the cutter 54 is optionally brought into contact with the cutting wall 52 with the cutting wall 52 disposed in the pan 58. The center $C_C$ of the cutter 54 is aligned coaxially to the center $C_F$ of the cutting wall 52 and the inner face 74 of the cutting wall 52 is abutted against the plurality of cutting fins 100 of the cutter 54. In particular, the outer cutting edge 110 of each of the plurality of cutting fins 100 optionally forms a substantially complementary fit with the inner face 74 of the cutting wall 52. Additionally, the leading cutting edge 108 of each of the plurality of cutting fins 100 is optionally substantially coterminous with the bottom 72 of the cutting wall 52 when the top 70 of the cutting wall 52 is received against the plurality of shoulders 106 of the cutter 54 and the outer cutting edge 110 of each of the plurality of cutting fins 100 is received against the inner face 74 of the cutting wall 52. However, the leading cutting edge 108 also optionally extends substantially below the bottom 72 of the cutting wall 52 once the top 70 of the cutting wall 52 is received against the plurality of shoulders 106 and the outer cutting edge 110 of each of the plurality of cutting fins 100 is received against inner face 74.

The press 56 is pushed into to the cutter 54, for example with the cutting wall 52 received in the cutter 54 and the cutting wall 52 disposed in the pan 58. In particular, the centers $C_P$, $C_C$ are aligned and the plurality of press heads 122 of the press 56 are inserted through the plurality of openings 96 in the top wall 90 of the cutter 54. Each of the plurality of press heads 122 is received through one of the plurality of openings 96, respectively, and into one of the plurality of spaces 102 (FIG. 6) between the plurality of cutting fins 100, respectively.

FIGS. 13-19 illustrate a method of making the pizza 10 with the system, according to an embodiment of the invention. Generally, the method optionally includes enclosing a filling 24 in the outer portion 18 of the crust 12, segmenting the outer portion 18 of the crust 12 into the plurality of dough segments 22, turning each of the plurality of dough segments 22 (FIG. 1) relative to the perimeter 20 of the inner portion 16, disposing at least one topping 14 on the inner portion 16 of the crust 12, and baking the pizza 10.

Figure 13:
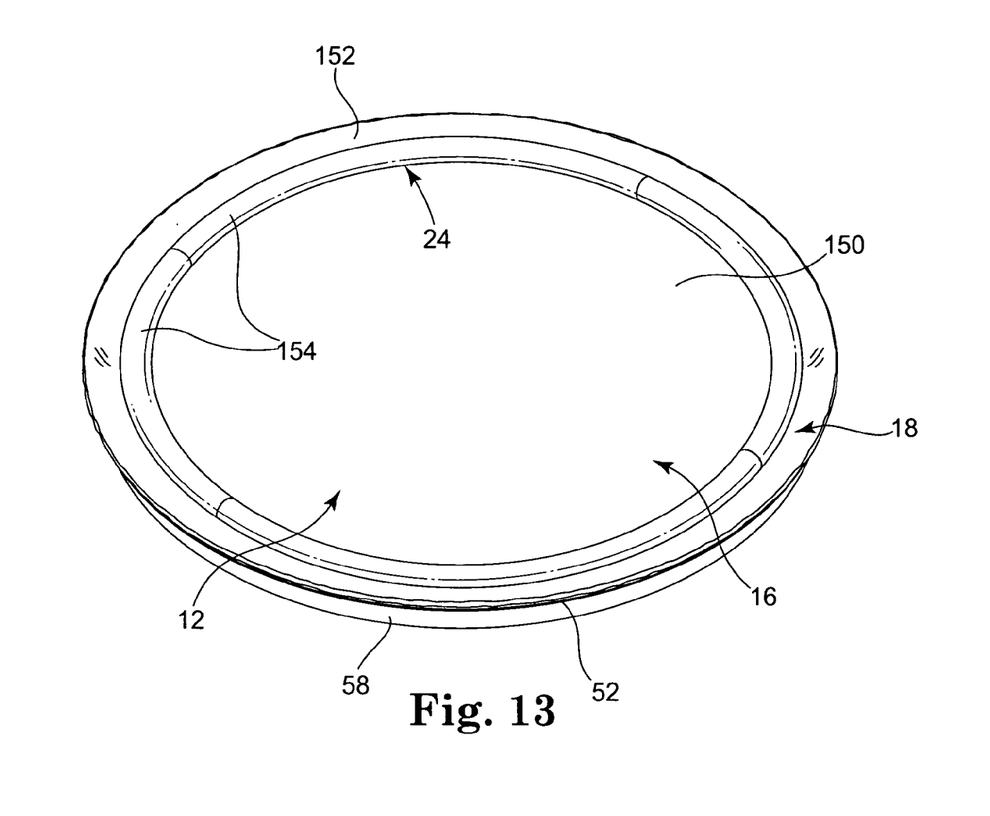
FIGS. 13-19 are illustrative of a method of making a pizza, according to an embodiment of the present invention.

With reference to FIG. 13, the cutting wall 52 is disposed in the pan 58. The crust 12 is optionally formed by stretching a mass of dough 150 on the pan 58 and along the inner face 74 (FIG. 12) of the cutting wall 52 to form a lip 152. The lip 152 optionally extends above the top 70 of the cutting wall 52, for example by about one-quarter inch, although other dimensions are contemplated. The filling 24 is disposed against the lip 152. For example, the filling 24 is optionally a plurality of pieces of string cheese 154 disposed circumferentially around the crust 12 proximate the lip 152. Other types of fillings are also contemplated, such as other types of cheeses, sauces, meats, and others.

Figure 14:
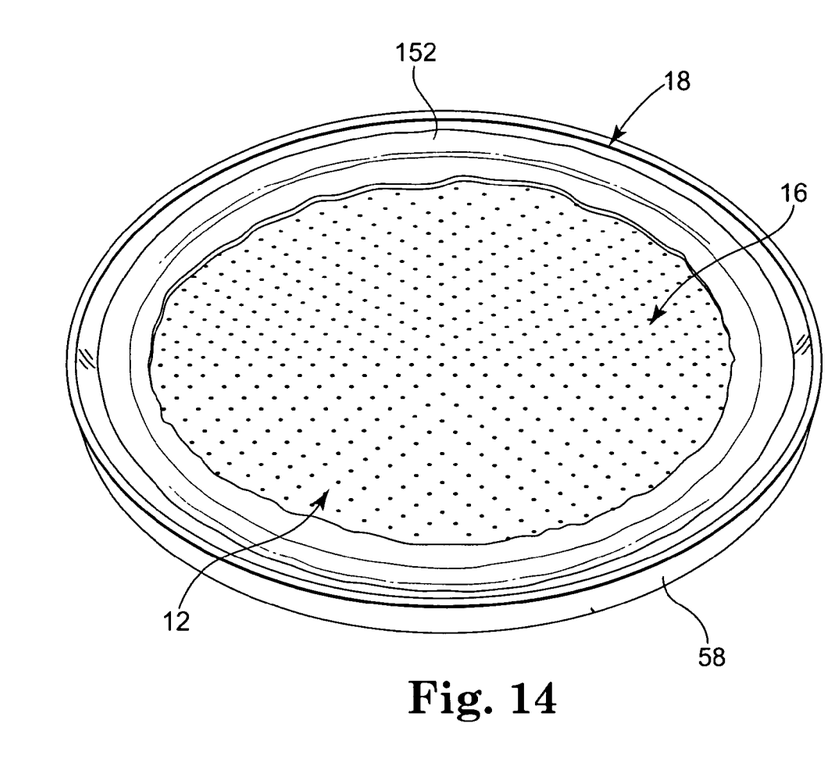

With reference to FIG. 14, the lip 152 is then stretched and/or folded over the filling 24 (covered by the lip 152 in FIG. 14). At this point, the outer portion 18 of the crust 12 optionally extends substantially continuously about the inner portion 16. The inner portion 16 is optionally docked or perforated as desired.

Figure 15:
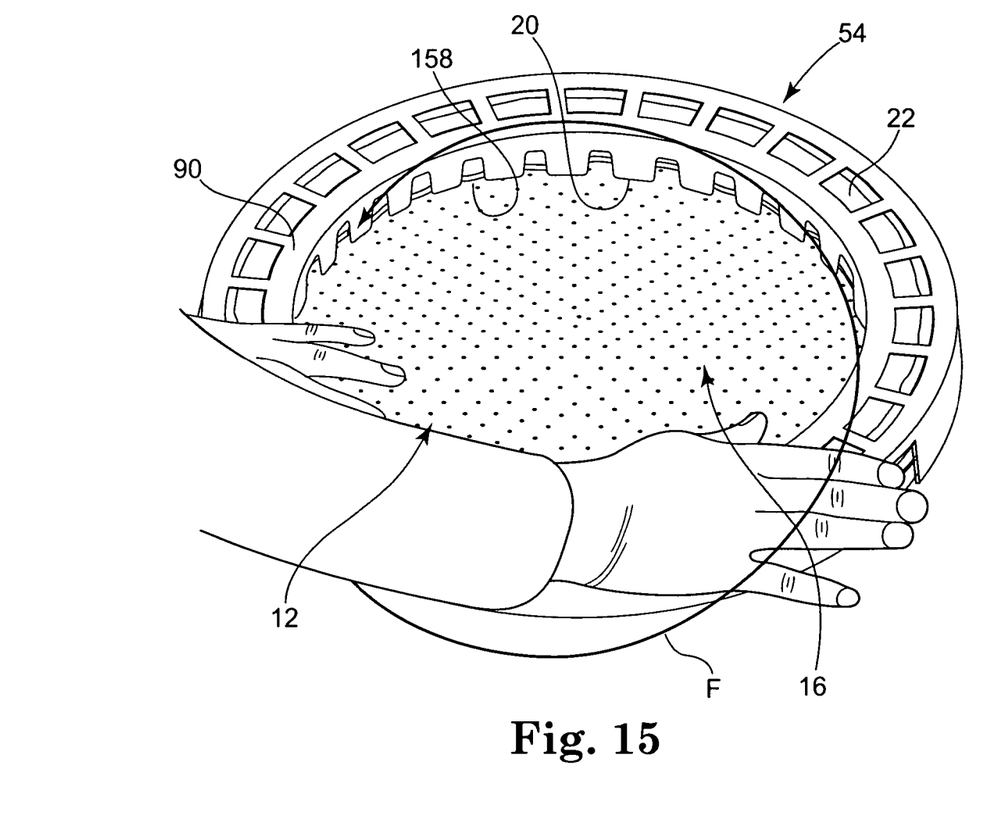

With reference to FIG. 15, the cutter 54 is then centered to the cutting wall 52 with the plurality of cutting fins 100 (FIG. 12) disposed over the substantially monolithic outer portion 18 of the crust 12. The cutter 54 is then "set" by pressing the cutter 54 into the outer portion 18 of the crust 12. In order to segment, or divide, the outer portion 18 of the crust into the plurality of dough segments 22, the leading cutting edge 108 (FIG. 12) of each of the plurality of cuttings fins 100 is pressed through the outer portion 18 of the crust 12 a desired amount, for example entirely through the crust 12 and against the pan 58 (FIG. 13). In turn the outer cutting edge 110 (FIG. 12) of each of the plurality of cutting fins 100 is pressed through the outer portion 18 of the crust 12 and abutted against the cutting wall 52 to form a substantially complementary fit. A clean cut through the outer portion 18 is optionally accomplished with the operator pressing two hands, palm down, on the top wall 90 of the cutter 54 at positions about an entirety of the top wall 90. Additionally, or alternatively, the operator optionally presses down with the palm, running the palm about the top wall 90 in a circular pattern F as shown.

Figure 16:
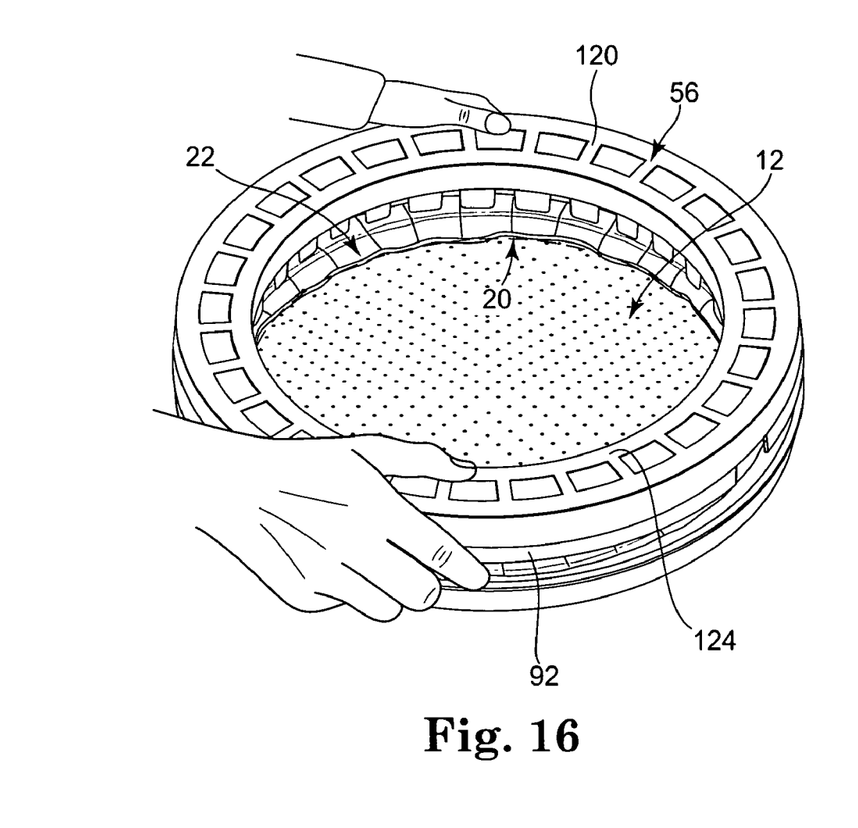

With reference to FIG. 16, the cutter 54 is then optionally removed from the outer portion 18 of the crust 12 by using the press 56. In particular, the plurality of press heads 122 (FIG. 12) of the press 56 are aligned to the plurality of openings 96 (FIG. 12) in the top wall 90 (FIG. 15) of the cutter 54. The plurality of press heads 122 are then pressed downwardly through the plurality of openings 96 and into the plurality of spaces 102 (FIG. 6) between the plurality of cutting fins 100. For example, the user presses downwardly on the top 124 of the mounting ring 120 with the palms of the hands, with fingers of the hands grasping the outer wall 92 of the cutter 54.

With the downward motion of the press 56, the bottom 130 (FIG. 11) of each of the plurality of press heads 122 is abutted and pressed against each of the plurality of dough segments 22. At the same time, or otherwise substantially simultaneously, the cutter 54 is pulled upwardly away from the plurality of dough segments 22 with the fingers. In particular, by employing a pressing and pulling action a user is able to help ensure that the plurality of dough segments 22 are not pulled away from the crust 12 when the cutter 54 is removed.

Figure 17A:
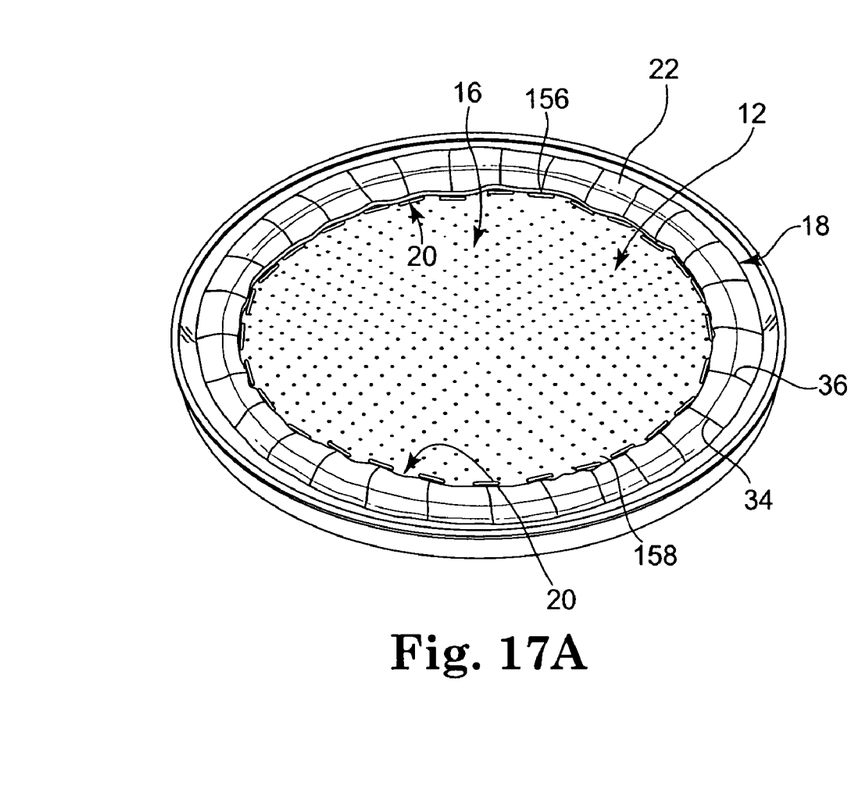

With reference to FIG. 17A, the plurality of dough segments 22 are disposed end-to-end, with the first and second ends 34, 36 of each of the plurality dough segments 22 facing an adjacent end of a dough segment 22. Additionally, where the inner wall 94 of the cutter 54 has the plurality of windows 114, a plurality of perforations 156 is formed about the perimeter 20 of the inner portion 16 with a plurality of dough tabs 158 connecting each of the plurality of dough segments 22 to the inner portion 16 of the crust 12.

Figure 17B:
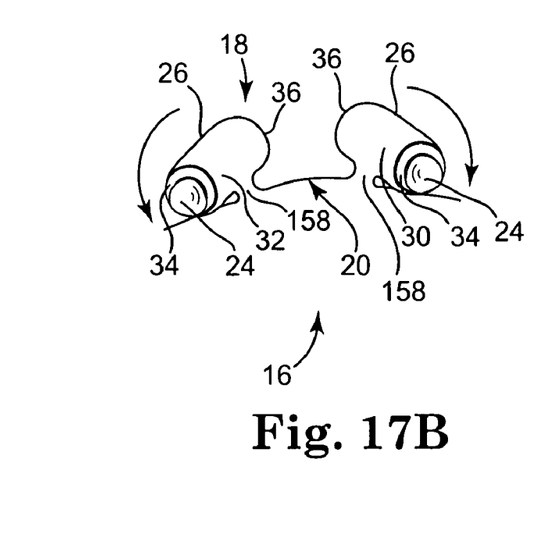

As shown in FIG. 17B, each of the plurality of dough segments 22 is then manually repositioned by turning, twisting, or rotating. For example, a user optionally grasps one or more of the dough segments 22 and rotates the dough segments 22 about the dough tabs 158, to reorient the dough segments 22 with the first end 34 toward the inner portion 16 of the crust 12 and the second end 36 extending away from the inner portion 16 of the crust 12. The first end 34 of each of the plurality of dough segments 22 is optionally reoriented to extend substantially inwardly over the perimeter 20 of the inner portion 16 and onto the inner portion 16 with the second end 36 of each of the plurality of dough segments 22 extending substantially outwardly away from the perimeter 20. In this manner, the dough tabs 158 are optionally characterized as twisted or otherwise include dough that has been rotated or includes a rotational orientation.

Figure 18:
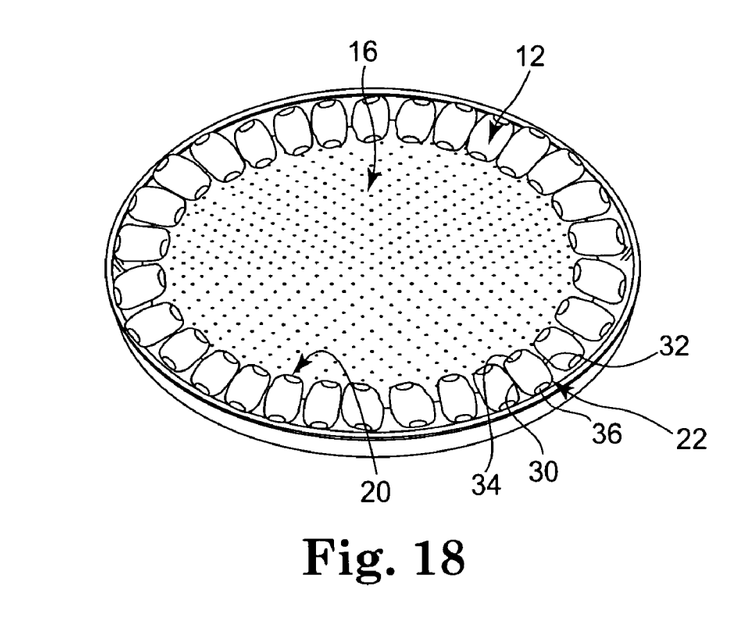

With reference to FIG. 18, each of the plurality of dough segments is optionally rotated about 90 degrees, greater than about 90 degrees, or less than about 90 degrees as desired. It should be noted that some of the plurality of dough segments 22 may twist back to some extent during baking or otherwise following their initial reorientation. Each of the plurality of dough segments 22 is optionally pressed downwardly onto the inner portion 16 following reorientation to help maintain each of the plurality of dough segments 22 in a desired orientation. As referenced above, each of the plurality of dough segments 22 optionally projects substantially radially from the perimeter 20. Additionally, the first and second sides 30, 32 of each of the plurality of dough segments 22 are distinct, or otherwise free or disconnected from, an adjacent dough segment 22. The plurality of dough segments 22 are optionally seasoned, buttered, or otherwise prepared for baking.

Figure 19:
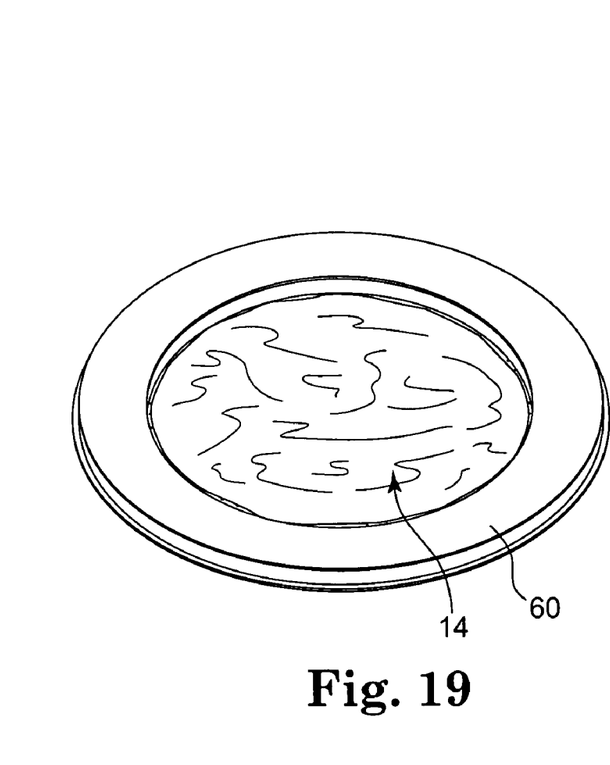

With reference to FIG. 19, the topping guide 60 is shown disposed over the outer portion 18, and in particular each of the plurality of dough segments 22. Generally, the topping guide 60 is adapted or otherwise sized and shaped to cover the outer portion 18. As shown, a topping 14 of sauce is optionally spooned onto the inner portion 16 using the topping guide 60 as a guide for where to dispose the sauce. Other toppings 14 are also optionally disposed on the inner portion 16 (see FIG. 1). The pizza 10 is optionally baked, frozen, or put through additional operations as desired.

Various advantages are optionally accomplished with reference to the above description. For example, a fun-to-eat, visually pleasing, and tasty segmented crust is provided where diners are able to pull off one or more of the plurality of dough segments 22 as desired. The pizza 10 is able to be provided in a baked state in a restaurant, for example; in a frozen state in a grocery store, for example; in an uncooked, but assembled state to be taken home and cooked, for example; in a partially assembled state for a consumer to put desired toppings on at home and bake, for example; and others.

In the foregoing detailed description, reference is made to the accompanying drawings which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. Additionally, geometric terms are to be interpreted in a broad sense. For example, "annular" or "ring" as used through the specification is intended to describe a generally ring shaped object, including, but not limited to square ring shapes, circular ring shapes, ovular ring shapes, triangular ring shapes, and others. It is to be understood that other embodiments may be utilized and structural or logical changes may be made without departing from the scope of the present invention. The foregoing detailed description, therefore, is not to be taken in a limiting sense.

Although the invention has been described with respect to particular embodiments, such embodiments are for illustrative purposes only and should not be construed to limit the invention. Various alternatives and changes will be apparent to those of ordinary skill in the art. For example, although disclosed above as being formed in a particular shape or of a particular size, other suitable shapes and sizes are also contemplated. Other modifications within the scope of the invention and its various embodiments will be apparent to those of ordinary skill.

What is claimed is:

1. A pizza comprising:
   a dough member defining a substantially flattened shape, the dough member including a central portion defining a perimeter, and a border portion extending about the perimeter of the central portion; and
   at least one topping disposed on the central portion of the dough member;
   wherein the border portion of the dough member is divided into a plurality of dough segments, each dough segment extending from a first end to a second end opposite the first end, and each dough segment turned relative to the perimeter of the central portion, such that the first end of each dough segment extends toward the central portion, while the second end of each dough segment extends away from the central portion, with the first and second ends of each dough segment being disconnected from adjacent dough segments.

2. The pizza of claim 1, wherein each of the plurality of dough segments has a filling disposed in the dough segment.

3. The pizza of claim 2, wherein a portion of the filling is exposed and protrudes from each of the first and second ends.

4. The pizza of claim 1, wherein the each of the plurality of dough segments is connected to the central portion of the dough member with a tab of dough, the tab of dough being twisted.

5. The pizza of claim 1, wherein each of the plurality of dough segments includes the first end and the second end opposite the first end, and further defines a top, a bottom opposite the top, a first side, and a second side opposite the first side, wherein at least a portion of the first side, the second side, the second end, the top, and the bottom are disconnected from the central portion of the dough member.

6. The pizza of claim 1, wherein each of the plurality of dough segments is substantially tubular in shape.

7. A pizza comprising:
   a central dough portion maintaining a topping, the central dough portion defining a perimeter; and
   a plurality of dough members extending substantially radially from the central dough portion, each of the plurality of dough members extending from a first end to a second end opposite the first end, with the first end facing the central dough portion, and the second end facing away from the central dough portion, each of the plurality of dough members furthering including
   a top side,
   a bottom side opposite the top side,
   a first side disconnected from an adjacent one of the plurality of dough members, and
   a second side disconnected from an adjacent one of the plurality of dough members.

8. The pizza of claim 7, wherein each of the plurality of dough members includes a filling.

9. The pizza of claim 8, wherein at least one of the plurality of dough members is characterized by the filling being exposed and protruding from at least one of the first and second ends of the dough member.

10. The pizza of claim 7, wherein each of the plurality of dough members is attached to the central dough portion with a twisted dough tab.

\* \* \* \* \*